US008528181B2

(12) United States Patent
Maurell et al.

(10) Patent No.: US 8,528,181 B2
(45) Date of Patent: Sep. 10, 2013

(54) ALIGNMENT OF MACHINE COMPONENTS WITHIN CASINGS

(75) Inventors: Orestes Maurell, W. Palm Beach, FL (US); Martin Zingg, Jupiter, FL (US)

(73) Assignee: Alstom Technology Ltd, Baden (CH)

( * ) Notice: Subject to any disclaimer, the term of this patent is extended or adjusted under 35 U.S.C. 154(b) by 811 days.

(21) Appl. No.: 12/501,189

(22) Filed: Jul. 10, 2009

(65) Prior Publication Data

US 2011/0005054 A1 Jan. 13, 2011

(51) Int. Cl.
*B23P 11/00* (2006.01)
*B64F 5/00* (2006.01)

(52) U.S. Cl.
USPC ............. 29/434; 29/464; 29/281.1; 254/89 R; 414/589

(58) Field of Classification Search
USPC .............. 29/464, 434, 281.1; 254/3 R, 89 H, 254/89 R; 414/589, 590; 415/126
See application file for complete search history.

(56) References Cited

U.S. PATENT DOCUMENTS

| | | | | |
|---|---|---|---|---|
| 3,269,677 | A * | 8/1966 | Stoeckly | 248/554 |
| 3,628,884 | A * | 12/1971 | Mierley, Sr. | 415/213.1 |
| 4,440,265 | A * | 4/1984 | Spagnoli | 182/129 |
| 4,461,455 | A * | 7/1984 | Mills et al. | 254/3 R |
| 4,491,307 | A * | 1/1985 | Ellefson | 269/55 |
| 5,722,512 | A * | 3/1998 | Lilja et al. | 187/244 |
| 6,170,141 | B1 * | 1/2001 | Rossway et al. | 29/281.1 |
| 6,224,332 | B1 | 5/2001 | Leach et al. | |
| 6,292,999 | B1 * | 9/2001 | Rossway et al. | 29/559 |
| 6,298,536 | B1 * | 10/2001 | Rossway et al. | 29/281.1 |
| 2002/0197147 | A1 | 12/2002 | Kawai et al. | |
| 2007/0119182 | A1 | 5/2007 | Czachor et al. | |
| 2007/0189893 | A1 | 8/2007 | Burdgick | |
| 2008/0034759 | A1 | 2/2008 | Bulman et al. | |
| 2010/0132370 | A1 | 6/2010 | Durocher et al. | |

FOREIGN PATENT DOCUMENTS

| | | | |
|---|---|---|---|
| GB | 653285 | | 5/1951 |
| GB | 662371 | | 12/1951 |
| GB | 1125171 | | 8/1968 |
| JP | 10231737 A | * | 9/1998 |
| JP | 200732504 A | | 2/2007 |

* cited by examiner

*Primary Examiner* — Essama Omgba
(74) *Attorney, Agent, or Firm* — Volpe and Koenig, P.C.

(57) ABSTRACT

A method and device are provided to accurately align a machine component of generally circular cross-section within a surrounding machine casing that includes bottom and top halves of the casing. The bottom half and top half, in use, are bolted together at a split line occupying a horizontal plane. The component and the bottom half of the casing include complementary interdigitating members at three circumferentially spaced-apart locations, which include first and second locations at the split line on respective first and second horizontally opposed sides of the component, and a third location at bottom dead center. After lowering the component into the bottom half to engage the interdigitating members at the three locations, jacking apparatus is operated independently at each location to incrementally reposition the component within the bottom half. Shims are then inserted between the interdigitating members at the three locations to maintain the jacked position of the component.

5 Claims, 5 Drawing Sheets

ALIGNMENT OF MACHINE COMPONENTS WITHIN CASINGS

FIELD OF INVENTION

The present disclosure relates to a technique and apparatus for accurately aligning heavy machine components of generally circular cross-section within surrounding casings, and has particular relevance to alignment of annular combustors within the casings of large, heavy-duty gas turbine engines.

BACKGROUND

Correct positioning of an annular combustor within the casings of a gas turbine engine is very important, because precise alignment with respect to the injection of fuel, inflow of air and the turbine is required to avoid excessive stresses on combustor components and to aid proper combustion. Incorrect alignment of the combustor increases stresses on combustor components that interface with the turbine nozzle guide vanes, resulting in decreased component life.

A known method of combustor alignment utilizes the principle of cross-key location, shims being used between confronting location faces of the cross-keyed components to enable the making of fine adjustments to combustor alignment. However, to obtain satisfactory alignment of the combustor in this way can be very time-consuming, particularly when the assembled combustor is large and heavy. Several iterations of the alignment procedure may be required, involving the use of several different thicknesses of shims between each set of confronting location faces. Moreover, a completely correct alignment cannot be guaranteed.

Therefore, to save time and reduce costs during manufacturing assembly of an engine and during rebuild of an engine after maintenance actions, it will be advantageous to have a faster and more precise way of obtaining correct combustor alignment.

SUMMARY

The disclosure is directed to a method to accurately align a machine component of generally circular cross-section within a surrounding machine casing that includes a bottom half of the casing and a top half of the casing. The bottom half and top half, in use, are bolted together at a split line occupying a horizontal plane. The component and the bottom half of the casing are provided with complementary interdigitating members at three circumferentially spaced-apart locations, which include first and second locations at the split line on respective first and second horizontally opposed sides of the component, and a third location at bottom dead center. The method includes the steps of:

(a) lowering the machine component into the bottom half of the casing to engage the interdigitating members at the three locations;

(b) engaging jacking apparatus at each of the three locations, the jacking apparatus being independently operative at each location to reposition the component within the bottom half of the casing, thereby to attain a jacked position of the component;

(c) inserting shims between the interdigitating members at the three locations to maintain the jacked position of the component; and repeating steps (b) and (c) as often as necessary to attain a desired position of the component within the bottom half of the casing.

The disclosure is also directed to an apparatus to accurately align a machine component of generally circular cross-section within a surrounding machine casing. The casing includes a bottom half of the casing and a top half of the casing bolted together at a split line occupying a horizontal plane, the component and the casing each have a longitudinal axis. The component and the bottom half of the casing are provided with complementary interdigitating members that engage each other at three circumferentially spaced-apart locations. The locations include first and second locations at the split line on respective first and second horizontally opposed sides of the component, and a third location at bottom dead center. The apparatus includes:

(a) mutually confronting location faces provided on the interdigitating members at each of the first and second locations, the location faces being positioned and oriented such that shims are insertable therebetween for vertical positional adjustment and axial positional adjustment of the component within the bottom half of the casing;

(b) mutually confronting location faces provided on the interdigitating members at the third location, the location faces being positioned and oriented such that shims are insertable therebetween for altering an attitude of the component within the casing and aligning the longitudinal axis of the component with a vertical plane containing the longitudinal axis of the casing;

(c) jacking apparatus at each of the three locations, the jacking apparatus being independently operative at each location to incrementally reposition the component to attain a desired jacked position of the component within the bottom half of the casing and to facilitate insertion of shims between the interdigitating members at the three locations to maintain the desired jacked position of the component after the jacking apparatus has been removed.

BRIEF DESCRIPTION OF THE DRAWINGS

Exemplary embodiments of the invention will now be described with reference to the accompanying drawings, which are not to scale.

DETAILED DESCRIPTION OF THE PREFERRED EMBODIMENTS

Introduction to the Embodiments

Figure 1:
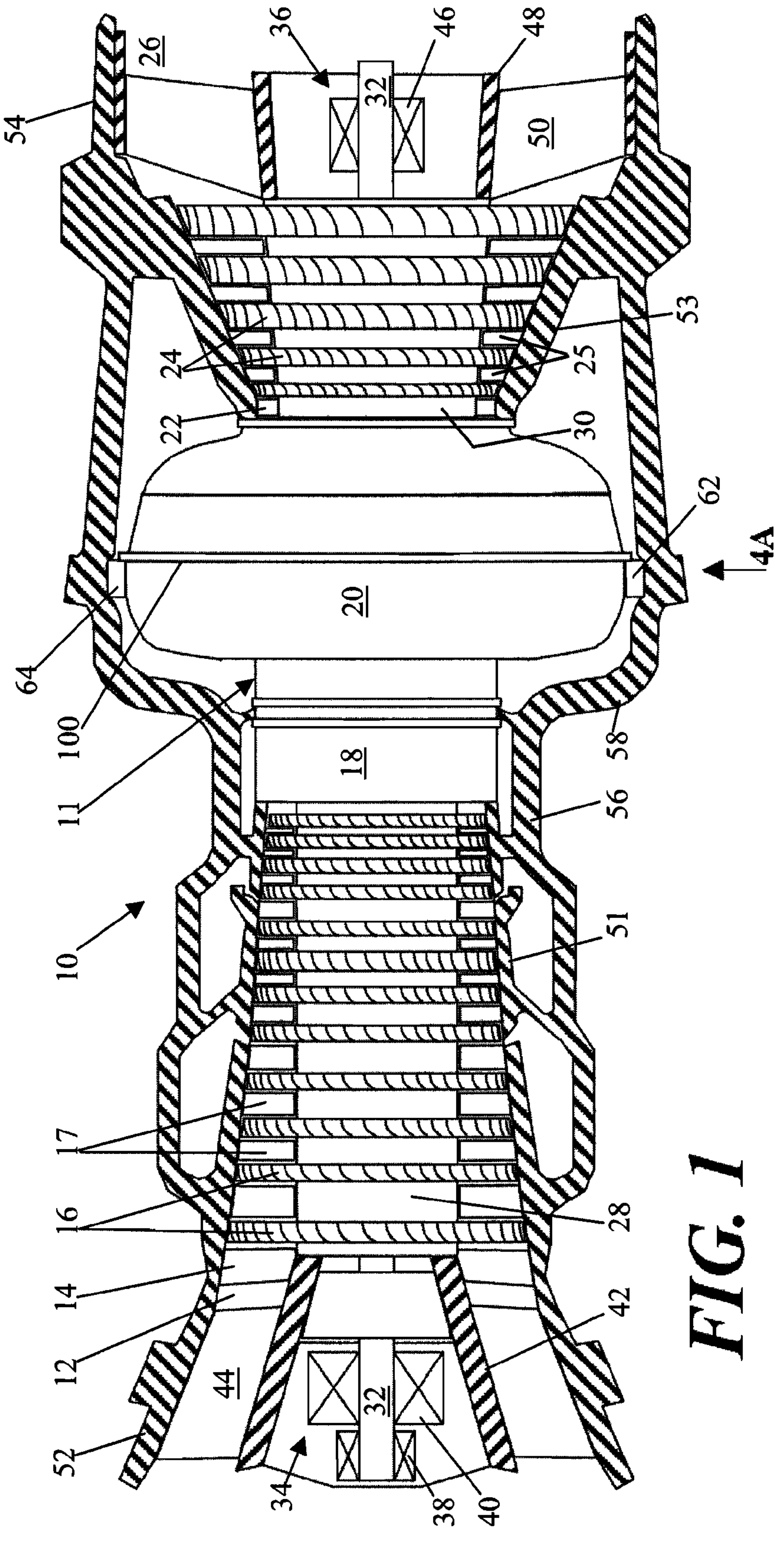
FIG. 1 is a diagrammatic cross-sectional plan view of a gas turbine engine to which the invention can be applied, the cross-section excluding the core of the engine and being taken on a horizontal, diametric split plane of the engine casing.

One aspect deals with a method to accurately align a machine component of generally circular cross-section within a surrounding machine casing that comprises a bottom half of the casing and a top half of the casing that in use are bolted together at a split line occupying a horizontal plane. The component and the bottom half of the casing are provided with complementary interdigitating members at three circumferentially spaced-apart locations comprising first and second locations at the split line on respective first and second horizontally opposed sides of the component, and a third location as near as possible to bottom dead centre. The method comprises the steps of:

(a) lowering the machine component into the bottom half of the casing to engage the interdigitating members at the three locations;

(b) engaging jacking apparatus at each of the three locations, the jacking apparatus being independently operative at each location to incrementally reposition the component within the bottom half of the casing, thereby to attain a jacked position of the component;

(c) inserting shims between the interdigitating members at the three locations to maintain the jacked position of the component; and (d) repeating steps (b) and (c) as often as necessary to attain a desired position of the component within the bottom half of the casing.

A preferred arrangement of the jacking apparatus is such that jacking at the first and second locations raises (or lowers) the component within the bottom half of the casing, whereas jacking at the third location alters the component's attitude within the bottom half of the casing. While the component is raised on the jacking apparatus, it is possible not only to adjust the component's axial position within the bottom half of the casing, but also to align the component's longitudinal axis with a vertical plane containing the casing's longitudinal axis.

The method is facilitated by apparatus that in a preferred embodiment includes:

(a) mutually confronting location faces provided on the interdigitating members at each of the first and second locations, the location faces being positioned and oriented such that shims are insertable therebetween for vertical positional adjustment and axial positional adjustment of the component within the bottom half of the casing;

(b) mutually confronting location faces provided on the interdigitating members at the third location, the location faces being positioned and oriented such that shims are insertable therebetween for altering an attitude of the component within the casing and aligning the longitudinal axis of the component with a vertical plane containing the longitudinal axis of the casing;

(c) jacking apparatus at each of the three locations, the jacking apparatus being independently operative at each location to incrementally reposition the component to attain a desired jacked position of the component within the bottom half of the casing and to facilitate insertion of shims between the interdigitating members at the three locations to maintain the desired jacked position of the component after the jacking apparatus has been removed.

Preferably, the jacking apparatus at each of the first and second locations includes:

(a) a base plate fixed to the bottom half of the casing at the split line;

(b) a lifting plate, a first end thereof making line contact with the base plate;

(c) an incrementally adjustable jack acting between the base plate and a second end of the lifting plate, such that when the jack raises or lowers the second end of the lifting plate, the lifting plate pivots about the first end thereof; and (d) a connection between the lifting plate and an interdigitating member that is fixed to the component, whereby raising or lowering of the lifting plate correspondingly raises or lowers the component.

The jacking apparatus at each of the first and second locations may further include a screw jack arrangement acting between the base plate and opposed sides of the interdigitating member that is fixed to the component, thereby to adjust the axial position of the component within the bottom half of the casing while the lifting plates at the first and second locations are raised on their jacks.

It is preferred that the jacking apparatus at the third location includes:

(a) a base plate fixed to an interdigitating member that is fixed to the bottom half of the casing;

(b) a head plate fixed to the component;

(c) a connecting member fixed to the head plate and connecting the head plate to the base plate such that the head plate and the component fixed thereto is moveable with respect to the base plate and the casing, thereby to alter the attitude of the component within the casing;

(d) an incrementally adjustable jack acting between the base plate and the connecting member and operative to move the component as aforesaid.

DETAILED DESCRIPTION

Referring to FIG. 1, a gas turbine engine 10 has an engine core 11 including an annular air intake duct 12, compressor inlet guide vanes 14, multiple stages of compressor rotor blades 16 separated by compressor stator blades 17, a combustor entry duct 18, an annular combustor 20, turbine inlet nozzle guide vanes 22, multiple stages of turbine rotor blades 24 separated by turbine stator blades 25, and an exhaust duct 26. The compressor rotor blades 16 and the turbine rotor blades 24 are mounted on respective compressor and rotor drums 28, 30, these in turn being mounted on a rotor shaft 32, which defines the engine's longitudinal and rotational axis. Front and rear ends of the rotor shaft 32 are supported for rotation in respective bearing arrangements 34, 36, the front bearing races 38, 40 being held in a housing 42 supported by aerodynamically shaped struts 44 that extend across the intake duct 12, and the rear bearing race 46 being held in a housing 48 supported by aerodynamically shaped struts 50 that extend across the exhaust duct 26.

The engine 10 has robust exterior and interior casings, constructed from several axially consecutive casing sections, to support the various components of the engine core 11 (for simplicity of illustration in FIG. 1, divisions between axially consecutive casing parts are not shown). Hence, compressor and turbine stator blades 17, 25 are mounted in the surrounding inner casing sections 51, 53. To support the rotating parts of the engine core 11 within the exterior casing, the front and rear bearing housing support struts 44, 50, are fixed to respective front and rear casing sections 52, 54, which define the intake and exhaust ducts 12, 26. The combustor entry duct 18 is supported from a smaller diameter mid-casing section 56, while the outer shell of the combustor 20 is supported within the large diameter casing section 58 at three locations. One of the combustor support location is at the 6 o'clock position and is therefore hidden underneath the combustor in the view of FIG. 1, but is indicated by reference 60 in FIG. 2. The other two combustor support locations 62, 64, are diagrammatically indicated in FIG. 1, at the 3 o'clock and 9 o'clock positions on the outer circumference of the combustor 20. As will be explained later, support locations 62, 64 are different from support location 60.

Figure 2:
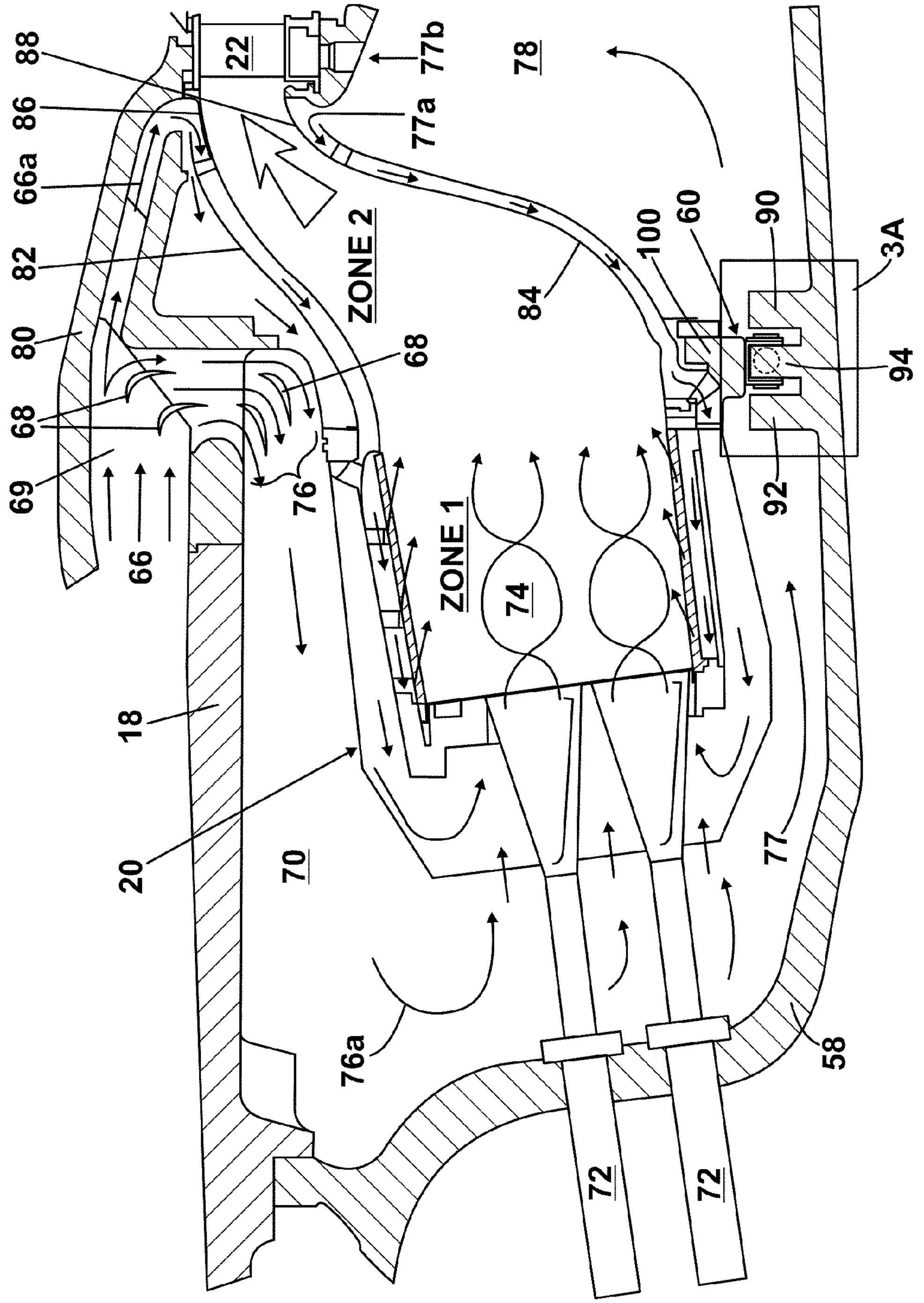
FIG. 2 is a diagrammatic cross-section of the combustor and adjacent parts on the underside of the engine of FIG. 1; the cross-section is taken in a vertical plane including the longitudinal axis of the engine.

Looking now at the more detailed view of FIG. 2, a major portion of the compressed air 66 at the rear of the combustor entry duct 18 is turned through an angle approaching 180 degrees by deflector vanes 68 and flows into a plenum chamber 70, which is defined between the outer wall of the combustor entry duct 18 and the large diameter casing section 58. Most of the air 76 that flows into the plenum chamber 70 enters the front end of the combustor 20 as combustion air **76*a* and is mixed with fuel that enters the combustor through an annular array of equi-angularly spaced-apart pairs of fuel lances 72. However, a proportion 77 of the air 76 flows through the gap between the combustor 20 and the casing section 58 into the chamber 78 and is used to cool the outside of the combustor. After use for this purpose, a proportion 77*a* of air 77 is used to cool the radially outer combustion liner 84, as shown by the arrows, the combustion liner 84 being double-walled as shown, so that the cooling air can flow between the walls. To obtain similar cooling of the radially inner combustion liner 82, a minor proportion 66*a* of the compressed air 66 at the rear of the combustor entry duct 18 is not turned into the plenum chamber 70, but as shown by the arrows, is allowed to continue rearward through duct 80 for a short distance before being turned through nearly 180 degrees and channeled between the double walls of the radially inner combustion liner 82**. Hence, for both inner and outer combustion liners, cooling occurs due to cooling air flowing between their double walls as well as over the liner's external surfaces.

In the combustion chamber, combustion is initiated in the swirling flow 74 in Zone 1 and completed in Zone 2, from where the combustion gases are channeled into the turbine through the annular array of nozzle guide vanes 22 at the combustor exit. It should be noted that the nozzle guide vanes 22 are hollow so that a proportion **77*b* of air 77** can pass through them for cooling.

It will be understood that the combustor components are subject to high heat stresses from the combustion gases and that combustor misalignment within the exterior casings could allow leakage of hot combustion gases from the combustor and/or result in excessive mechanical stress, perhaps causing damage to some components. In FIG. 2, the components most likely to be affected by misalignment include:

The so-called "tipping segments" 86, which connect the radially inner combustion liner 82 to the nozzle guide vanes 22, control leakage of compressed air into the hot gas path at the exit of the combustor, and prevent back-flow of hot gases from the combustor into the combustor entry duct 18.

The so-called "bone segments" 88, which connect the radially outer combustion liner 84 to the nozzle guide vanes 22, control leakage of compressed air into the hot gas path at the exit of the combustor, and prevent leakage of hot gases from the combustor into the chamber 78.

As previously mentioned, the combustor 20 is supported within the exterior casing at the three locations 60, 62 and 64, which will now be explained in more detail.

As shown in FIG. 2 and FIGS. 3A to 3C, location 60 comprises five location features, namely three blocks 90, 92, 94 that protrude inwardly from the casing section 58 and two blocks 96, 98 that protrude outwardly from a bolting flange 100 on the combustor. Blocks 90, 92 and 94 are preferably cast integrally with the casing section 58, though they could alternatively be welded or bolted onto it. Blocks 96 and 98 may be cast integrally with the bolting flange 100, or welded onto it, but are preferably bolted onto it. Blocks 90 and 92 comprise flanges with a substantially rectangular cross-section whose longitudinal dimension extends at right angles to the rotational axis of the engine 10; block 94 is a robust cylindrical tine or prong located mid-way between the flanges 90, 92; and blocks 96 and 98 comprise a pair of robust projections with a rectangular or square cross-section, which in the assembled engine fit in the gap 95 between the flanges 90 and 92, one on each side of the cylindrical tine 94.

Figure 3A:
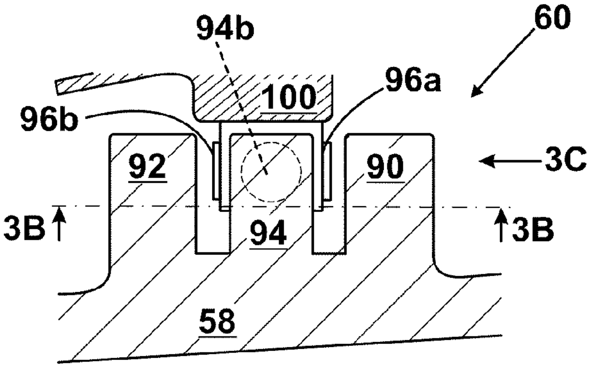
FIG. 3A is an enlarged view of the part of FIG. 2 within the rectangular outline 3A, comprising combustor location features.
Figure 3B:
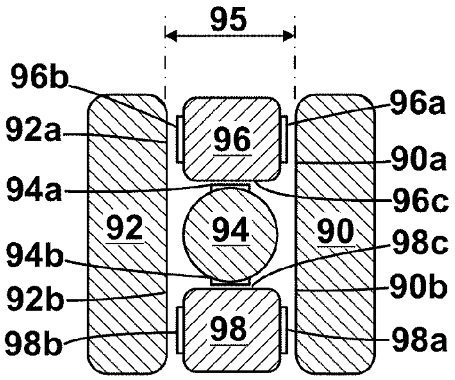
FIG. 3B is a view on horizontal section line 3B-3B in FIG. 3A.
Figure 3C:
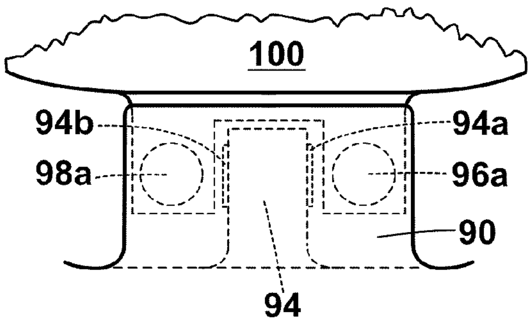
FIG. 3C is a partial view on arrow 3C in FIG. 3A, showing hidden detail of the combustor location features.

As shown in FIGS. 3A and 3B, flanges 90 and 92 are axially spaced-apart by a gap 95 and are each provided with a pair of flat, substantially rectangular location faces **90*a*, 90*b* and 92*a*, 92*b*, each location face being in a vertical plane oriented normally to the engine's rotational axis. Location faces 90*a* and 92*a* face each other across the gap 95, as do location faces 90*b*, 92*b***.

Tine 94 is provided with a pair of flat circular location faces **94*a*, 94*b*** on opposing sides of the tine, the plane of each location face being oriented parallel to a vertical plane coincident with the engine's rotational axis.

Projections 96 and 98 are each provided with three flat location faces **96*a* to 96*c* and 98*a* to 98*c* that confront corresponding location faces on flanges 90 and 92 and tine 94. Projection 96 has a pair of circular location faces 96*a*, 96*b* on its axially opposed sides, so that in the assembled engine, location face 96*a* confronts location face 90*a* on flange 90 and location face 96*b* confronts location face 92*a* on flange 92. Similarly, projection 98 has a pair of circular location faces 98*a*, 98*b* on its axially opposing sides, so that in the assembled engine, location face 98*a* confronts location face 90*b* on flange 90 and location face 98*b* confronts location face 92*b* on flange 92. A rectangular or square location face 96*c* and 98*c*, respectively, provide the third location face on each projection 96, 98 and are arranged so that in the assembled engine, location faces 96*c* and 94*a* confront each other, as do location faces 98*c* and 94*b***.

Figure 4A:
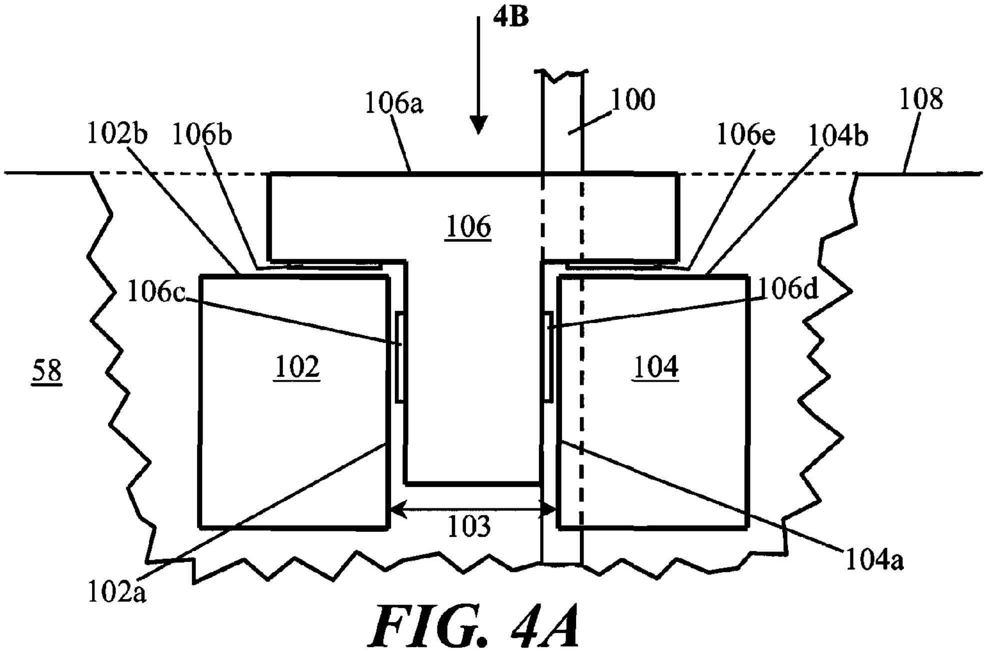
FIG. 4A is partial view on arrow 4A in FIG. 1, showing a side elevation of combustor location features located at the horizontal split plane of the engine casing.
Figure 4B:
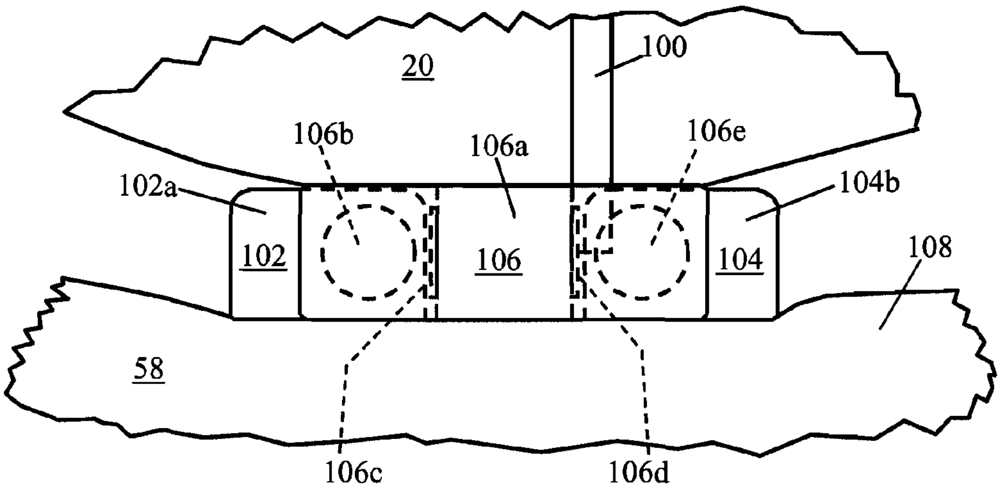
FIG. 4B is a plan view on arrow 4B of the combustor location features in FIG. 4A.

As shown in FIGS. 1, 4A and 4B, location 62 comprises three location features 102, 104 and 106. In FIG. 4A, the wall of the exterior casing section 58 is shown partly broken away to reveal them. Location features 102, 104 are axially spaced-apart so that there is a gap 103 between them and comprise blocks of rectangular section that project inwardly from the inner side of the exterior casing section 58. Blocks 102, 104 are preferably integrally cast with casing section 58, though they could alternatively be welded or bolted on. Location feature 106 is a T-shaped block that is preferably bolted onto the bolting flange 100 of the combustor 20, though it could alternatively be cast integrally with the flange 100, or welded on. When the combustor 20 is correctly assembled in the engine, the stem of the T-shaped block is positioned between the two rectangular section blocks 102, 105, and the top surface **106*a* of the T-shaped block 106 is substantially in-line with the engine casing's horizontal split plane 108**, which is aligned with the engine's rotational axis.

Location 64 is on the diametrically opposite side of the engine and except for being a mirror image of location 62, is structurally identical thereto.

Each block 102, 104 has two flat location faces 102*a*, 102*b* and 104*a*, 104*b*, with each block's location faces being set at right angles to each other. Location faces 102*a* and 104*a* are in mutually parallel vertical planes which are oriented normally to the engine's rotational axis, while location faces 102*b* and 104*b* share a common horizontal plane. T-shaped block 106 has four flat circular location faces 106*b* to 106*e*. Location faces 106*b* and 106*e* confront location faces 102*b* and 104*b*, respectively, and therefore lie in a common horizontal plane, whereas location faces 106*c* and 106*d* confront location faces 102*a* and 104*a*, respectively, and therefore lie in parallel vertical planes oriented normally to the engine rotational axis.

It has been the practice to install the assembled combustor 20 by using overhead lifting equipment to lower it into the bottom half of the engine casing so that outwardly pointing projections 96 and 98 on bolting flange 100 are inserted in the gap 95 between inwardly pointing flanges 90 and 92 on exterior casing section 58, with one projection 96, 98 located on each side of the central cylindrical tine 94. Simultaneously, the downwardly pointing stem of the T-shaped block 106 on bolting flange 100 is inserted in the gap 103 between the inwardly pointing blocks 102, 104. When located correctly within the engine, the combustor 20 can be bolted securely to other engine static structure. To achieve the correct location, the combustor remains attached to the lifting equipment while it is adjusted to its correct position and orientation, relative to the previously installed ring of nozzle guide vanes 22 and other engine internals, by insertion of shims between the confronting location faces described above.

Adjustment by insertion of shims is achieved as follows.

When the combustor 20 is suspended at locations 62 and 64, shimming at the 6 o'clock position, location 60, enables adjustment of combustor position by:

- centering, so that the combustor's centre is in a vertical plane that coincides with the engines' rotational axis, and
- tilting, comprising adjustment of its attitude within the casing, specifically the pitch angle of the combustor's longitudinal axis relative to the longitudinal axis of the casing, so that the combustor's exit annulus is at the correct attitude for attachment to the nozzle guide vane annulus 22.

Centering is achieved by inserting shims between the central inwardly pointing tine 94 and the outwardly pointing projections 96, 98, i.e., between location faces 94*a*/96*c*, and/or between location faces 94*b*/98*c*. Changes of tilt angle are achieved by inserting shims between the inwardly pointing flanges 90, 92 and the outwardly pointing projections 96, 98, i.e., between location faces 90*a*/96*a* and/or 90*b*/98*a*, and between location faces 92*a*/96*b* and/or 92*b*/98*b*.

Shimming at the 3 o'clock and 9 o'clock positions, locations 62 and 64, enables adjustment of combustor position by:

- aligning the combustor vertically, so that the combustor's centre is in a horizontal plane that coincides with the engines' rotational axis, and
- aligning the combustor axially, so that the combustor's exit annulus can dock correctly with the nozzle guide vane annulus 22.

Vertical alignment is achieved by inserting shims between the blocks 102, 104 and the cross-bar of the T-shaped block 106, i.e., between location faces 102*b*/106*b*, and/or between location faces 104*b*/106*e*. Axial alignment is achieved by inserting shims between the blocks 102, 104 and the stem of the T-shaped block 106, i.e., between location faces 102*a*/106*c*, and/or between location faces 104*a*/106*d*.

Figure 6:
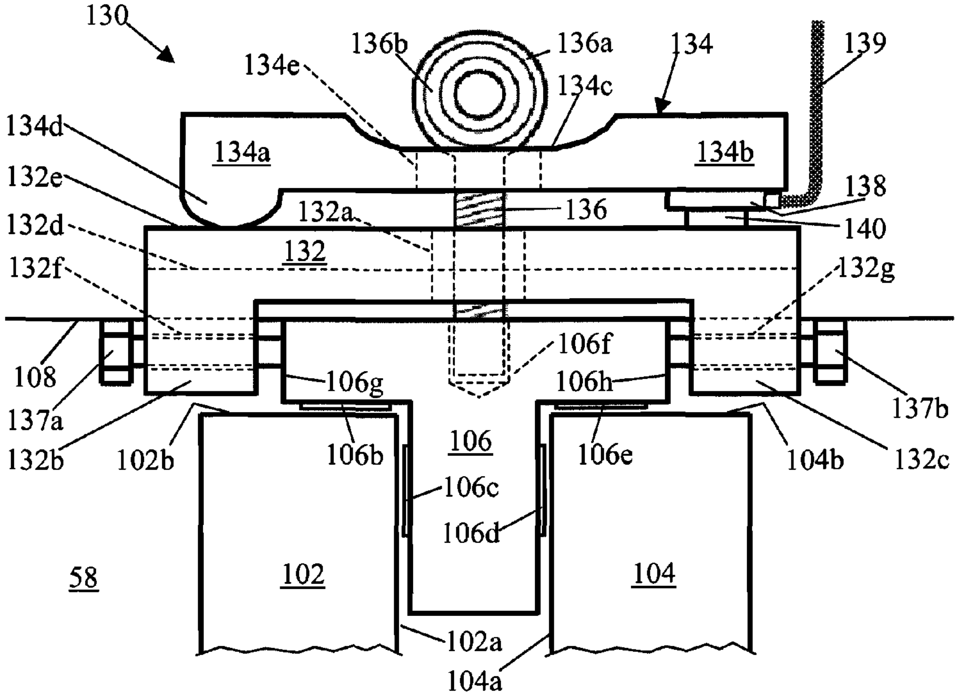
FIG. 6 diagrammatically illustrates a device to aid accurate adjustment of the location of the combustor within the casing using the combustor location features of FIGS. 4A and 4B.
Figure 5:
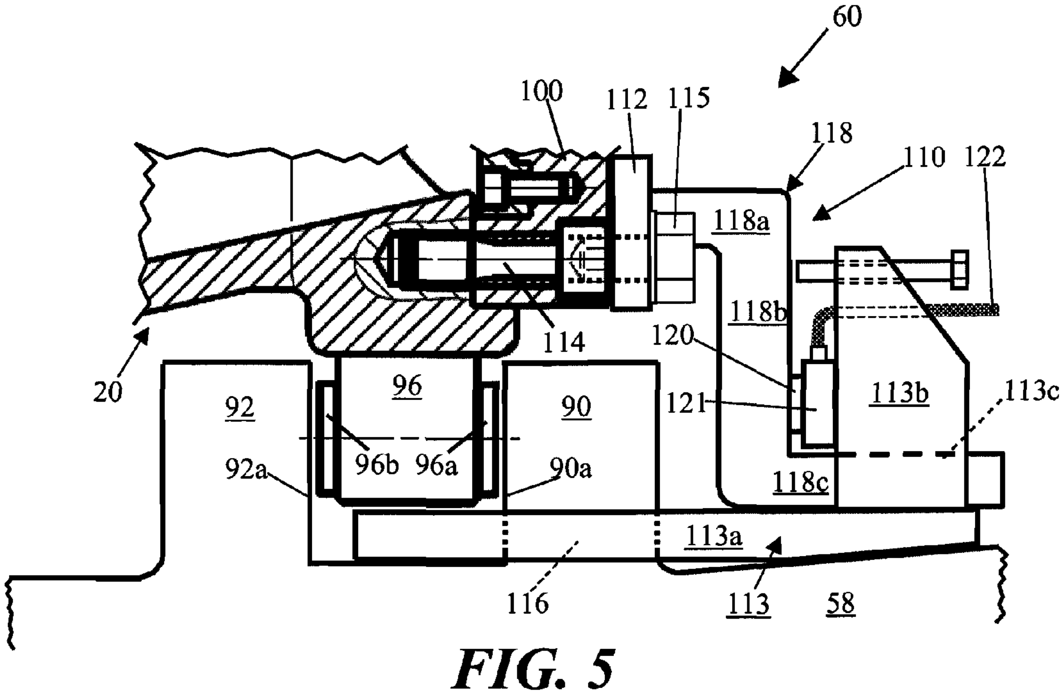
FIG. 5 diagrammatically illustrates a device to aid accurate adjustment of the location of the combustor within the casing using the combustor location features of FIGS. 3A to 3C.

The position of the combustor relative to the nozzle guide vanes 22 is critical for combustor integrity and service life. Precise alignment is required for proper combustion and to avoid interference fits between the combustor exit annulus and the nozzle guide vane annulus, which could result in excessive stresses on the "tipping segments" 86 and the "bone segments" 88 (FIG. 2). However, because inserting shims between location faces at one of the locations 60, 62, 64 affects spacing between location faces at the other two locations, the above-described shimming procedure has to be an iterative process of successive approximations to the ideal position of the combustor, involving the insertion and removal at each location of shims having different thicknesses. As such, it is very time-consuming. Moreover, the overhead lifting equipment used to suspend the combustor while the shim thicknesses are adjusted is difficult to control to the required degree of accuracy for exact positioning of the combustor. Consequently, we have developed the following apparatus and method to reduce the severity of these problems and increase the speed and accuracy of positioning. FIGS. 5 and 6 show the apparatus, which includes incrementally adjustable jacks 121, 138 to enable a speedier and more accurate positioning process. "Incrementally adjustable", means that the jacks are controllable to give small discrete jacking movements of, say, the order of one millimeter.

Referring first to FIG. 5, this shows a simplified, part-sectional, enlarged side-view of location 60 comprising the location features 90, 92 and 96, but with the features 94 and 98 omitted for clarity. To assist correct positioning of the combustor 20 with respect to its tilt relative to the nozzle guide vanes, a fixture 110 is sized to fit through an access hole (not shown) in the side of the casing 58. Fixture 110 has a head plate 112 that bolts on to the combustor's bolting ring 100 (or is otherwise detachably fixed thereto), a cranked arm 118, and a pedestal 113, comprising a horizontal base portion 113*a* and a vertical portion 113*b*, portion 113*b* being rigidly fixed to base 113*a* by, e.g., welding. Head plate 112 spans at least two circumferentially spaced bolt holes 114 on the bolting ring 100 and is fixed thereto by corresponding circumferentially spaced bolts 115, which are screwed into the bolt holes 114.

To secure the fixture 110 to the casing 58, pedestal base 113*a* is hooked around the location flange 90, whereby the flange projects through an aperture 116 in the base plate, the aperture being a close fit to the flange. Pedestal base 113*a* is thereby able to firmly support a lower horizontal portion 118*c* of the cranked arm 118, which is captured in a channel 113*c* of the pedestal's base portion 113*a*. Together, channel 113*c* and the base 113*a* comprise linear bearing surfaces for the horizontal portion 118*c* of the cranked arm 118. The bearing surfaces may be lined as required by a low-friction coating, such as PTFE, or the like. This allows forward and backward movements of the arm 118 generally parallel to the rotational axis of the turbine, as will now be explained.

The lower horizontal portion 118*c* of the cranked arm 118 is joined to the upper horizontal portion 118*a* by a vertical portion 118*b*, and a hydraulic cylinder jack 121 acts between the arm's vertical portion 118*b* and the pedestal's vertical portion 113*b*, whereby the arm can be moved incrementally backwards or forwards relative to the pedestal 113 and casing 58 by the action of the hydraulic jack's plunger 120. The hydraulic cylinder 121 is pressurised through a flexible armored hydraulic tube 122, which is connected to a hand-operated hydraulic pump (not shown). A suitable hydraulic pump and cylinder combination is, for example, an Enerpac® P142 pump and an Enerpac® RSM 100 cylinder, see http:// www.enerpac.com. Because the pedestal 113 is immovably engaged with the flange 90, incremental fore-and-aft movements of the arm 118 can be used to incrementally change the combustor's tilt angle while the combustor 20 is suspended at locations 62 and 64, shims being inserted as appropriate to maintain the position against the pivot weight of the combustor after removal of pressure from the hydraulic cylinder 121. Between hydraulically assisted adjustments of pitch angle, centering of the combustor can be accomplished by insertion of shims between tine 94 and projections 96, 98, as noted previously. All shims at location 60 are initially installed undersized to allow for insertion of additional shims after final positioning of the combustor using apparatus installed at locations 62 and 64, as described below.

Turning now to FIG. 6, a fixture 130 is provided to assist correct positioning of the combustor with respect to its vertical and axial alignment. It should be understood that the apparatus now to be described in connection with location 62 is duplicated at location 64 on the opposite side of the engine 10 as a "mirror image" (laterally inverted) version, thereby enabling the same types of adjustments to be made on both sides of the engine. Therefore, the following description of the apparatus associated with location 62 will also suffice for a description of the apparatus associated with location 64.

FIG. 6 is a diagrammatic side elevation of location 62 looking outwards from the combustor, the bolting flange 100 of the combustor 20 thereby being excluded from the view. It comprises a base plate 132; a lifting plate 134 overlying the base plate; a screw-threaded tie rod 136 that connects the lifting plate to the T-block 106 through a large hole or slot **132*a* in the base plate, for adjustment of the T-block's vertical position relative to the base plate 132; and twin threaded bolts 137*a*, 137*b*, which pass through axially opposed end-pieces 132*b*, 132*c* of the base plate to enable adjustment of the T-block's axial position relative to the base plate. The base plate 132 and the lifting plate 134** may be machined from two pieces of steel bar or plate stock.

The base plate 132 has a horizontally extending skirt or platform portion **132*d*, which is hidden in FIG. 6 but whose thickness is indicated by the dashed line. The platform portion 132*d* extends over, and is seated on, the engine casing's horizontal split plane 108** and is fixed thereto by bolts or setscrews (not shown).

With regard to the tie rod 136, its bottom end is secured in a threaded hole **106*f* in the top of the T-block 106 and its top end 136*a* is constituted by a ball swivel 136*b* that is held in a PTFE lined steel bearing race within the tie rod end 136*a*. A suitable tie-rod for use in this embodiment is a McMaster-Carr® tie-rod with a right-hand thread and a ball joint rod end, part number 607451K281, see http://www.mcmaster.com. The top side of the lifting plate 134 is provided with a support groove 134*c* for the tie rod end 136*a***.

With regard to the lifting plate 134, it may be described as having a pivot end **134*a* and a jacking end 134*b*. The underside of the pivot end 134*a* is provided with a part-cylindrical portion 134*d*, through which the lifting plate makes line contact with the top side 132*e* of the base plate. To facilitate incremental raising and lowering of the jacking end 134*b* of the lifting plate, the underside of the jacking end 134*b* is seated on a hydraulic cylinder 138. This is pressurised through a flexible armored hydraulic tube 139, which is connected to a hand-operated hydraulic pump (not shown). The Enerpac® hydraulic pump and cylinder combination noted previously can be used here. The hydraulic cylinder's plunger 140 contacts the top side 132*e* of the base plate 132. Hence, when the hydraulic cylinder 138 is pressurised or depressurized, the lifting plate 134 pivots about its pivot end 134*a* as its jacking end 134*b* is raised or lowered by small increments in and out of the hydraulic plunger 139, thereby raising or lowering the T-shaped block 106 and the attached combustor 20 through the tie rod 136. As the jacking end 134*b* of the lifting plate is raised or lowered, the ball swivel 136*b* enables the top end 136*a* of the tie rod to move by small increments as required within the support groove 134*c*. Ball swivel 136*b* also enables the tie rod to remain vertically oriented as the vertical position of the combustor is adjusted and maintained by inserting shims between the location faces 102*b*/106*b* and 104*b*/106*e***.

Regarding axial positioning of the combustor 20, FIG. 6 shows that the part of the base-plate 132 which projects inwardly from the casing 58 over the T-shaped block 106, is shaped like a horizontally aligned square bracket ⌐¬, with two downward-pointing arms **132*b*, 132*c*. Threaded bolts 137*a*, 137*b* pass through corresponding axially extending threaded holes 132*f*, 132*g* in the downward-pointing arms 132*b*, 132*c* and flat ends of the bolts bear against axially opposed flat ends 106*g*, 106*h* of the cross-bar of the T-shaped block 106. The bolts 137*a*, 137*b* run parallel to the engine's rotational axis and when rotated in a complementary manner (e.g., bolt 137*a* clockwise and bolt 137*b* the same amount counterclockwise), they cause the T-block 106, and hence the combustor 20, to move to-and-fro axially relative to the base plate 132 and the fixed structure of the engine, in particular the nozzle guide vane annulus 22. In effect, the bolts act like a screw jack arrangement to move the combustor axially with respect to the engine casing. This enables the axial position of the combustor to be adjusted and then maintained by inserting shims between the location faces 102*a*/106*c* and 104*a*/106*d***.

The fixture 130 and hydraulic jack 138 at locations 62 and 64 also facilitates minor side-to-side adjustment of the combustor (i.e., horizontal movements normal to the engine's rotational axis) while it is raised on the hydraulic jack, the correct positioning being maintained by inserting (or removing) shims between the location faces **94*a*/96*c* and 94*b*/98*c* at location 60**.

Once the position of the outlet of the combustor 20 (as defined by the tipping segments 86 and the bone segments 88, FIG. 2) has been satisfactorily adjusted relative to the inlet side of the nozzle guide vane annulus 22 as described above, the combustor can be secured in its final position within the engine and the fixtures 110 and 130, with their associated hydraulic jacks, can be removed. Final assembly of the engine can then continue. Furthermore, during maintenance of the engine, the fixtures 110 and 130 allow adjustment of the shims without disassembly or removal of the combustor from the engine, so reducing engine outage time and enabling more exact alignment of the combustor. Proper combustor alignment reduces stresses on Zone 2 of the combustor, resulting in increased component life.

Whereas the above description has focused mainly on the use of hydraulic jacks to incrementally adjust the position of a machine component within a machine casing, other types of jacking apparatus, such as screw jacks, may be substituted for hydraulic jacks, provided such apparatus is controllable to move the component by small amounts.

The present invention has been described above purely by way of example, and modifications can be made within the scope of the invention as claimed. Thus, the breadth and scope of the present invention should not be limited by any of the above-described exemplary embodiments. Each feature disclosed in the specification, including the claims and drawings, may be replaced by alternative features serving the same, equivalent or similar purposes, unless expressly stated otherwise.

Unless the context clearly requires otherwise, throughout the description and the claims, the words "comprise", "comprising", and its cognates, are to be construed in an inclusive as opposed to an exclusive or exhaustive sense; that is to say, in the sense of "including, but not limited to".

What is claimed is:

1. A method to accurately align a machine component of generally circular cross-section within a surrounding machine casing that comprises a bottom half of the casing and a top half of the casing that in use are bolted together at a split line occupying a horizontal plane, the component and the bottom half of the casing being provided with complementary interdigitating members at three circumferentially spaced-apart locations comprising first and second locations at the split line on respective first and second horizontally opposed sides of the component, and a third location at bottom dead center, the method comprising the steps of:

(a) lowering the machine component into the bottom half of the casing to engage the interdigitating members at the three locations;

(b) engaging a jacking apparatus at each of the three locations, the jacking apparatus being independently operative at each location to reposition the component within the bottom half of the casing, thereby to attain a jacked position of the component;

(c) inserting shims between the interdigitating members at the three locations to maintain the jacked position of the component; and (d) repeating steps (b) and (c) as often as necessary to attain a desired position of the component within the bottom half of the casing.

2. The method according to claim 1, wherein jacking at the first and second locations raises or lowers the component within the bottom half of the casing.

3. The method according to claim 2, comprising the further step of adjusting an axial position of the component within the bottom half of the casing while the component is raised on the jacking apparatus.

4. The method according to claim 2, comprising the further step of aligning a longitudinal axis of the component with a vertical plane containing a longitudinal axis of the casing while the component is raised on the jacking apparatus.

5. The method according to claim 1, wherein jacking at the third location alters an attitude of the component within the bottom half of the casing.

* * * * *